3,043,298
PLASTER OF PARIS BANDAGE CONTAINING HYDROXY PROPYL METHYL CELLULOSE
Leo Brickman, Metuchen, and Martin I. Edenbaum, New Brunswick, N.J., assignors to Johnson & Johnson, a corporation of New Jersey
No Drawing. Filed Apr. 25, 1958, Ser. No. 730,824
4 Claims. (Cl. 128—91)

The present invention relates to plaster of Paris products and more particularly to plaster of Paris impregnated wrappings.

Plaster of Paris has heretofore been used to impregnate fabric sheets in the formation of plaster of Paris bandages, the fabric generally being a crinoline or other loosely woven fabric material. The plaster of Paris impregnated strips are primarily for orthopedic use. The bandages prior to use are dipped in water for a brief period by the physician and then wrapped around the portion of the body of the patient which it is desired to immobilize.

Many surgeons prefer a bandage in which the plaster of Paris has a smooth, creamy texture when wet. Bandages having such a texture appear to mold easier, giving an intimate contact with the surface wrapped, and have more the consistency during forming of a plastic moldable mass than a plaster coated fabric. Also, the final cast has a smoother and generally more attractive appearance. Casts are sometimes modified or reinforced after having set by removal of a portion and rewrapping. Also, where a large part of the body is being placed in a cast, the cast is placed on the body in sections. Where this is done, the first section is usually set before the next section can be applied. In order to obtain a strong uniform cast, it is necessary that a good bond be obtained between the later applied wet wrappings and the previously set cast.

In preparing plaster of Paris bandages, a paste of the plaster of Paris is first prepared by slurrying the plaster of Paris with the liquid. The paste is then spread on the fabric carrier. It is common practice to include with the plaster an adhesive to help bond the plaster to the fabric. The liquid medium used in preparing the slurry may be either an organic solvent where a retarder to prevent hydrolysis of the plaster of Paris is not used or may be water where a suitable retarder such, for example, as ammonium borate is employed. Where the liquid medium used is an organic solvent, a product which has a creamy texture after wetting with water can be obtained by mixing with the plaster of Paris a small amount of methyl cellulose. However, where the plaster of Paris is spread on the carrier sheet by using water as the liquid medium, inclusion of methyl cellulose fails to give a product which has the desired creamy texture on later wetting with water prior to use. Furthermore, the inclusion of the methyl cellulose appears to appreciably weaken the plaster of Paris when set, which results in weaker casts being obtained.

It is an object of the present invention to prepare plaster of Paris bandages having a creamy consistency or texture when wet with water just prior to application. It is a further object of the present invention to prepare such creamy textured plaster of Paris bandages which have a strong adherence when wrapped onto previously set plaster of Paris casts. It has now been discovered that these and other objects and advantages are obtained if a small amount of hydroxy propyl methyl cellulose is blended with the plaster of Paris when preparing the adhesive bandage. The hydroxy propyl methyl celluloses found to be particularly suitable are the hydroxy propyl methyl celluloses having from 5 to 50% hydroxy propoxyl groups ($OCH_2 \cdot CHOH \cdot CH_3$) and 22 to 30% methoxyl groups ($OCH_3$). These hydroxyl propyl methyl celluloses may vary in viscosity from about 25 to about 4,000 cps. Not only does the resulting product on later wetting have the smooth and creamy texture desired, but the plaster of Paris bandages thus formed show an exceptionally strong bond when applied to previously set plaster of Paris wraps. Also, the inclusion of hydroxy propyl methyl cellulose does not appreciably affect the strength of the final cast as does the inclusion of methyl cellulose.

Although in practicing the present invention it is generally preferred to use a completely aqueous system using a retarder of the type and in the amount described in Eberl 2,557,083, for example ammonium borate in amounts of about 0.1 to 2.0 parts by weight ammonium borate [$(NH_4)_2HBO_3$] per 100 parts plaster of Paris, an organic liquid retarder such as a water-soluble organic liquid may be used. Various water-soluble organic liquids can be used for this purpose, for example, methyl, ethyl, propyl and isopropyl alcohols, water soluble ketones such as methyl and ethyl ketones, and acetone. Where an organic liquid is used as the retarder, the organic liquid is generally used in a substantial amount. For example, with isopropyl alcohol, the liquid medium in which the plaster of Paris would be slurried would generally contain about 95 to 50% by weight isopropyl alcohol and 5 to 50% by volume water. One of the disadvantages in using an organic liquid as the retarding agent is that organic liquids are relatively expensive as compared with water, and the use of substantial amounts of organic liquids adds to the cost of the process. However, in some instances, it has been noted that the final cast is somewhat stronger where a water and water-soluble organic liquid system has been used for dispersing the plaster of Paris as compared to where a wholly aqueous system was employed. Although it is not necessary to use other retarders such as ammonium borate when an organic liquid is included with the water in slurrying the plaster of Paris prior to spreading, ammonium borate may be included and is desirable where the amount of organic liquid used is less than 50% by weight of the organic liquid water medium used.

In practicing the present invention, the hydroxy propyl methyl cellulose ether is admixed with the plaster of Paris in amounts of about 0.1 to 3.0 parts by weight of hydroxy propyl methyl cellulose per 100 parts by weight of the plaster of Paris. In the preferred practice, generally about 0.3 to 1.0 parts by weight of the hydroxy propyl methyl cellulose per 100 parts by weight of plaster of Paris is used.

The practice of the present invention is further illustrated by the following examples. These are given for purposes of illustration only and the invention is not limited thereto.

*Example 1*

A water solution is prepared containing 1.2 parts of ammonia and 0.6 parts of boric acid in 30 parts of water. To this is added 1.2 parts by weight potassium sulfate. A second solution is prepared by dissolving 0.33 parts of Methocel 60 HG having a viscosity of 400 cps. (methoxyl 27 to 30% and hydroxy propoxyl 7.5 to 9.5%) and 0.22 parts of Methocel 60 HG having a viscosity of 25 cps. in 25 parts of water. Dextrin in the amount of 1.67 parts is then dissolved in this second solution. The two solutions are mixed together and 0.05 parts of a wetting agent (Alkanol B, a sodium alkyl naphthyl sulfonate) and 1 part of polyvinyl acetate emulsion added. The resulting solution is mixed for about 1 to 2 minutes with 100 parts of plaster of Paris to form a slurry having a somewhat pasty consistency. The slurry is spread onto a gauze fabric having a thread count of 32 x 28 threads to the inch and then dried at a temperature of between 100 to 125° C. for 5 to 10 minutes.

The resulting plaster of Paris impregnated fabric has excellent bonding of the plaster of Paris to the fabric base. When the dried plaster of Paris impregnated fabric is wet by immersing in water for about 5 seconds and then removed, it has a smooth and creamy texture substantially different from that obtained by products in which the hydroxy propyl methyl cellulose is omitted. On wrapping a form with bandages prepared in the above manner, the bandage sets into a hard uniform cast after about 5 minutes. A second wrap placed on the set cast adheres strongly and on setting gives a final cast in which all layers are securely bonded to each other.

Example 2

To 30 parts of water is added 1.67 parts of dextrin and the solution then heated until the dextrin is dissolved or dispersed. To the hot solution is added 0.5 parts of Methocel 60 HG having a viscosity of 4000 cps. The solution is cooled to about 20 to 25° C. and stirred until the Methocel is completely dissolved. To another 25 parts of water is added 1.2 parts of potassium sulfate, and the mixture stirred until the potassium sulfate is completely dissolved. This is followed by 1.2 parts of 30% ammonia and 0.6 parts of boric acid, followed by 0.05 parts of Alkanol B. Stirring is continued until everything is completely dissolved; then the two solutions are mixed together. To this final solution is added 100 parts of plaster of Paris, and the mixture stirred for about 5 minutes to give a thick, smooth paste. The paste is coated on 32 x 28 bleached gauze and dried for 5 to 10 minutes at 100 to 125° C.

Example 3

Following the procedure of Example 2, a slurry is prepared using, for every 100 parts by weight of plaster of Paris, 0.4 parts boric acid, 0.8 parts of concentrated ammonia, 0.5 parts of Methocel 90 HG (hydroxy propoxyl 6 to 12% and methoxyl 22 to 25%) having a viscosity of 4000 cps., 1.67 parts of dextrin, 0.05 parts of Alkanol B and 55 parts of water. The slurry is spread on bleached gauze and dried as described in Example 2 to form the final product.

Example 4

A hydroxy propyl methyl cellulose ether having a viscosity of about 400 cps., a hydroxy propoxyl content of 6 to 12% and a methoxyl content of about 22 to 25% is used in the process of Example 1 in place of the Methocel 60 HG.

Example 5

Following the procedure of Example 1, a solution is made up of the following ingredients: 0.6 parts boric acid, 1.2 parts of ammonia, 0.5 parts of Methocel 60 HG having a viscosity of 4000 cps., 0.3 parts of Methocel 90 HG having a viscosity of 400 cps., 1.67 parts of dextrin, 0.05 parts of Alkanol B, 1.2 parts of potassium sulfate, and 55 parts of water. The solution is mixed with 100 parts of low-consistency plaster of Paris such as that sold under the trade name Hydrocal. The slurry is then spread on 28 x 24 bleached and tentered gauze and dried at 125° C. for 5 minutes.

Example 6

To 55 parts of water is added 1.2 parts of ammonia and 0.6 parts of boric acid. The mixture is stirred until the boric acid is completely dissolved. To this is added 1.2 parts of potassium sulfate, and the mixture again stirred until it is completely dissolved. To this is added 0.05 parts of Alkanol B and 0.5 parts of Methocel 60 HG having a viscosity of 4000 cps. and the mixture vigorously stirred until a clear, thick solution is obtained. To this is now added 100 parts of plaster of Paris. The mass is mixed for 5 minutes and then spread on gauze and dried as previousoly described.

Example 7

Dissolve 0.5 parts of Methocel 60 HG having a viscosity of 4000 cps. and 0.1 parts of Alkanol B in a solution of 9 parts of water to 41 parts of isopropyl alcohol. To this add 0.35 parts of polyvinyl acetate and 1.2 parts of potassium sulfate. The solution is mixed thoroughly for about 3 minutes with 100 parts of plaster of Paris. The slurry is spread on a gauze fabric such as 32 x 28 tobacco cloth and then dried at temperatures of 100 to 125° C. for about 5 minutes.

The use of acetone or methyl Cellosolve in the place of isopropyl alcohol in like amounts gives substantially the same results.

Example 8

Dissolve 0.28 parts Methocel 60 HG having a viscosity of 400 cps., 0.28 parts Methocel 60 HG having a viscosity of 50 cps., and 0.1 parts of Alkanol B in a solution of 9 parts of water to 41 parts of methyl alcohol. To this add 0.35 parts of polyvinyl acetone and 1.2 parts of potassium sulfate. The solution is mixed for 3 minutes with 100 parts of plaster of Paris. The slurry is spread on 32 x 28 bleached gauze and dried for 5 minutes at 100 to 125° C.

Example 9

Instead of Methocel 60 HG 4000 cps., Methocel 90 HG having a viscosity of 4000 cps. is used in the formulas given in Examples 7 and 8.

Example 10

Dissolve 0.5 parts Methocel 65 HG having a viscosity of 4000 cps. and 0.05 parts of a wetting agent in a combination of 9 parts of water to 41 parts of ethyl alcohol. Then add 0.3 parts of potassium sulfate. The solution is now mixed for 3 minutes with 100 parts of plaster of Paris. The slurry is spread on 28 x 24 bleached and tentered gauze and dried at 125° C. for 5 minutes.

The plaster of Paris bandages prepared in accordance with the above examples have the desired smooth, creamy texture. The bandages also have about the same setting time as that of Example 1 and show excellent bonding to previously set wrappings.

In the examples given, sodium alkyl naphthyl sulfonate has been used as the wetting agent. Other wetting agents may be used, however, and the invention is not limited to the use of any particular wetting agent, the wetting agent serving only to help in preparing the slurry and in wetting the gauze with the same during spreading. Care should be taken, however, not to use too much wetting agent since it may retard the setting time of the plaster of Paris. Among other wetting agents which have been found to be suitable are sulfated alcohols, such as sodium lauryl sulfate and the quaternary ammonium compounds, such as cetyl trimethyl ammonium bromide.

Having thus described our invention, we claim:

1. A plaster wrapping comprising a porous flexible carrier impregnated with plaster of Paris having admixed therewith a small amount of hydroxy propyl methyl cellulose.

2. A plaster of Paris bandage containing 0.1 to 3.0 parts by weight hydroxy propyl methyl cellulose per 100 parts by weight plaster of Paris.

3. A plaster of Paris bandage containing 0.1 to 3.0 parts by weight of a hydroxy propyl methyl cellulose per 100 parts by weight plaster of Paris, the hydroxy propyl methyl cellulose having on an average weight basis 5 to 50% by weight hydroxy propoxyl groups and 22 to 30% by weight methoxy groups.

4. A plaster of Paris bandage of claim 3 wherein the hydroxy propyl methyl cellulose is present in amounts of 0.3 to 1.0 part by weight per 100 parts by weight of plaster of Paris.

References Cited in the file of this patent

UNITED STATES PATENTS

| | | |
|---|---|---|
| 2,538,051 | Schick | Jan. 16, 1951 |
| 2,557,083 | Eberl | June 19, 1951 |
| 2,842,120 | Foglia et al. | July 8, 1958 |